United States Patent
Schmidt et al.

(10) Patent No.: US 10,704,642 B2
(45) Date of Patent: Jul. 7, 2020

(54) PISTON/DAMPER TUBE ASSEMBLY, VIBRATION DAMPER AND METHOD FOR OPERATING A COMPRESSION STAGE OF A VIBRATION DAMPER

(71) Applicants: ThyssenKrupp Bilstein GmbH, Ennepetal (DE); thyssenkrupp AG, Essen (DE)

(72) Inventors: Christoph Schmidt, Bonn (DE); Dmitrij Smeljanskij, Leverkusen (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/250,152

(22) Filed: Jan. 17, 2019

(65) Prior Publication Data

US 2019/0226545 A1  Jul. 25, 2019

(30) Foreign Application Priority Data

Jan. 24, 2018 (DE) .......................... 10 2018 201 091

(51) Int. Cl.
  *F16F 9/06* (2006.01)
  *F16F 9/32* (2006.01)
  (Continued)

(52) U.S. Cl.
  CPC .............. *F16F 9/067* (2013.01); *B60G 13/08* (2013.01); *B60G 17/08* (2013.01); *F16F 9/062* (2013.01);
  (Continued)

(58) Field of Classification Search
  CPC .. F16F 9/067; F16F 9/185; F16F 9/062; F16F 9/065; F16F 9/3214; F16F 9/3257;
  (Continued)

(56) References Cited

U.S. PATENT DOCUMENTS

| | | | | |
|---|---|---|---|---|
| 4,325,468 A | * | 4/1982 | Siorek | F16F 9/34 137/529 |
| 4,356,898 A | * | 11/1982 | Guzder | F16F 9/3482 188/280 |
| 4,597,411 A | * | 7/1986 | Lizell | F16F 9/465 137/493.8 |
| 4,623,049 A | * | 11/1986 | Warren | F16F 9/50 188/281 |

(Continued)

FOREIGN PATENT DOCUMENTS

| | | |
|---|---|---|
| DE | 41 39 820 A | 6/1993 |
| DE | 4294772 T | 7/1994 |

(Continued)

*Primary Examiner* — Pamela Rodriguez
(74) *Attorney, Agent, or Firm* — thyssenkrupp North America, LLC

(57) ABSTRACT

A piston/damper tube assembly may include a damper tube with damping fluid, a movable piston rod, a working piston, a controllable 4-way bottom valve with a control member, and a compensation space. Two flow passage ways of the bottom valve connect the working space remote from the piston rod via the control member to the compensation space. Two control ways of the bottom valve load the control member on a first side with a pressure of the piston rod-side working space and on a second side with a pressure of the compensation space. The control member may control the flow passage ways in a manner dependent on the pressure of the piston-rod-side working space that prevails on the control member on the first side via a fluidic connection, and on the pressure of the compensation space that prevails on the control member on the second side via an opening.

10 Claims, 2 Drawing Sheets

(51) Int. Cl.
*F16F 9/50* (2006.01)
*B60G 17/08* (2006.01)
*B60G 13/08* (2006.01)
*F16F 9/18* (2006.01)
*F16F 9/512* (2006.01)

(52) U.S. Cl.
CPC .............. *F16F 9/065* (2013.01); *F16F 9/185* (2013.01); *F16F 9/3214* (2013.01); *F16F 9/3257* (2013.01); *F16F 9/50* (2013.01); *F16F 9/512* (2013.01); *B60G 2202/24* (2013.01); *B60G 2500/10* (2013.01); *B60G 2800/162* (2013.01); *F16F 2222/12* (2013.01); *F16F 2228/066* (2013.01)

(58) Field of Classification Search
CPC ........ F16F 9/50; F16F 9/512; F16F 2228/066; F16F 2222/12; B60G 2800/162; B60G 17/08; B60G 2500/10; B60G 2202/24; B60G 13/08
USPC ..... 188/322.14, 314, 315, 269, 280, 322.15, 188/322.19
See application file for complete search history.

(56) References Cited

U.S. PATENT DOCUMENTS

| | | | | |
|---|---|---|---|---|
| 4,834,088 | A | * | 5/1989 | Jeanson ................ F16F 9/5123 188/298 |
| 5,113,979 | A | * | 5/1992 | Driessen ................ B60G 17/08 188/280 |
| 5,220,983 | A | * | 6/1993 | Furrer ................ B60G 17/002 188/274 |
| 5,386,893 | A | * | 2/1995 | Feigel ...................... F16F 9/18 188/266.5 |
| 2007/0251777 | A1 | * | 11/2007 | Li .......................... F16F 9/062 188/282.9 |
| 2017/0234396 | A1 | | 8/2017 | Hamers |

FOREIGN PATENT DOCUMENTS

| | | |
|---|---|---|
| DE | 102 36 963 B | 6/2004 |
| DE | 60304304 T | 11/2006 |
| DE | 10 2007 009 012 B | 6/2008 |
| EP | 1505315 A2 * | 2/2005 |
| JP | 360197417 A * | 10/1985 |

* cited by examiner

PISTON/DAMPER TUBE ASSEMBLY, VIBRATION DAMPER AND METHOD FOR OPERATING A COMPRESSION STAGE OF A VIBRATION DAMPER

CROSS REFERENCE TO RELATED APPLICATION

This application is a non-provisional application claiming priority to German Patent Application No. DE 10 2018 201 091.9, which was filed Jan. 24, 2018, the entire contents of which are hereby incorporated by reference herein.

FIELD

The present disclosure generally relates to piston/damper tube assemblies, to vibration dampers comprising piston/damper tube assemblies, and to methods for operating a compression stage of vibration dampers.

BACKGROUND

Many piston/damper tube assemblies and vibration dampers are known in the prior art. For example, German Patent Publication No. DE 10 2007 009 012 B3 has disclosed a piston/cylinder assembly with an adjustable damping force in a vibration damper. A bottom valve is provided in the piston/cylinder assembly, which bottom valve is loaded hydraulically with the pressure of the piston rod-side working space and mechanically with the prestressing force of a spring.

It is a problem in the case of the embodiments which are known in the prior art, during the determination of bottom valve characteristics, to achieve a compromise between driving comfort (damping force lower limit) and driving safety (damping force upper limit) with an overall design which is at the same time as simple and inexpensive as possible, in particular with a small number of element components.

Thus a need exists for an improved, compact piston/damper tube assembly and a vibration damper comprising the improved, compact piston/damper tube assembly. In particular, a need exists for a piston/damper tube assembly that is set to pressure changes in the compensation space and, at different gas pressures in the compensation space, provides a maximum possible adjusting range between a damping force lower limit and a damping force upper limit, especially in the compression stage.

DETAILED DESCRIPTION

Figure 1:
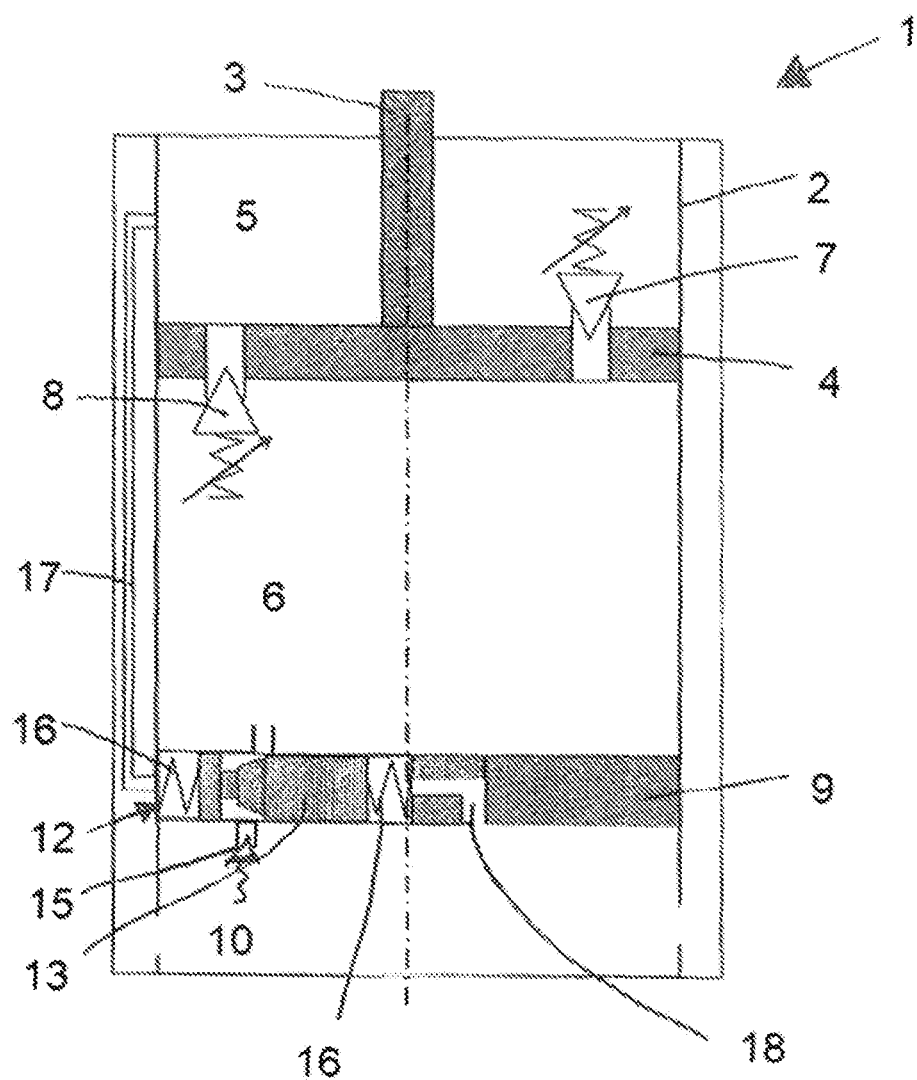
FIG. 1 is a diagrammatic view of a longitudinal section in a region of an example working piston and a bottom valve.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, an example piston/damper tube assembly may comprise:
  a damper tube which is filled at least partially with damping fluid and in which a piston rod can be moved to and fro, it being possible for a working piston to also be moved with the piston rod, by way of which working piston the interior space of the damper tube is divided into a piston rod-side working space and a working space which is remote from the piston rod, the working piston having at least one working piston compression stage valve and at least one working piston rebound stage valve for flow regulation of the damping fluid between the piston rod-side working space and the working space which is remote from the piston rod, the damper tube having an outer wall,
  a bottom valve, the bottom valve closing the working space which is remote from the piston rod,
  a compensation space, the compensation space being arranged on the bottom valve on that side of the bottom valve which faces away from the working space which is remote from the piston rod, the compensation space being filled partially with damping fluid,
the bottom valve having a controllable 4-way bottom valve with a control member, the first two ways of the 4-way bottom valve, as flow passage ways, connecting the working space which is remote from the piston rod via the control member to the compensation space, and the second two ways of the 4-way bottom valve, as control ways, loading the control member on one side with the pressure of the piston rod-side working space and on the other side with the pressure of the compensation space, the position of the control member controlling the flow passage way of the first two ways of the 4-way bottom valve at least in a manner which is dependent on that pressure of the piston-rod-side working space which prevails on the control member on the one side via a fluidic connection, and on that pressure of the compensation space which prevails on the control member on the other side via an opening.

In some examples, a vibration damper may comprise a piston/damper tube assembly.

In some examples, a method for operating a compression stage of a vibration damper may comprise:
  a) provision of the vibration damper according to either of the preceding claims, comprising a piston/damper tube assembly according to one of the preceding claims,
  b) at least partial compression of the vibration damper which is provided in step a), with the generation of compression stage damping forces,
in the case of the compression stage damping forces which are generated in step b), the throughflow control through the flow passage way of the first two ways of the 4-way bottom valve taking place at least in a manner which is dependent on that pressure of the piston rod-side working space and/or of the at least one restoring element which is arranged on the one side, which pressure prevails on the control member on the one side via a fluidic connection, and in a manner which is dependent on that pressure of the compensation space and/or of the at least one restoring element which is arranged on the other side, which pressure prevails on the control member on the other side via an opening, and in a manner which is dependent on that position of the control member which results herefrom.

The present disclosure can be implemented, for example and without limitation, in piston/damper tube assemblies and in vibration dampers, and in methods for operating a compression stage of vibration dampers.

In comparison with conventional piston/damper tube assemblies, the piston/damper tube assembly according to the present disclosure has the advantage that it has a bottom valve with a controllable 4-way bottom valve with a control member which is loaded on the two-way control way at least on the one side with the pressure of the piston rod-side working space and on the other side with the pressure of the compensation space and is therefore set to gas pressure changes in the compensation space, and at the same time, at different gas pressures in the compensation space, provides a maximum possible adjusting range between the damping force lower limit and the damping force upper limit, in particular in the compression stage. In addition, possible gas release from the damping fluid, which would substantially impair the functionality of the piston/damper tube assembly, is also prevented by way of the abovementioned interconnection. A connection in parallel and/or in series of the controllable 4-way bottom valve to form a bottom compression stage hard valve with additionally at least one bottom compression stage hard valve and/or one bottom rebound stage valve results in the advantage that a soft characteristic and a hard characteristic for supporting the maximum force in the compression stage can be set independently of one another, whereby a greatest possible adjusting range is ensured. Furthermore, a compact overall design and low complexity of the improved vibration damper, in particular of the improved piston/damper tube assembly, are to be made possible.

In comparison with conventional vibration dampers, the vibration damper according to the present disclosure has the advantage that the vibration damper is always supported and possible gas release from the damping fluid is prevented completely or partially. In addition, one bottom valve can be used for all characteristics, with the result that no adjusting is required. Furthermore, the soft characteristic can be reduced, which makes a greater spread between the hard characteristic and the soft characteristic possible.

In comparison with conventional methods, the method according to the present disclosure for operating a compression stage of a vibration damper has the advantage that the vibration damper is always supported and possible gas release from the damping fluid is prevented completely or partially. In addition, one bottom valve can be used for all characteristics, with the result that no adjusting is required. Furthermore, the soft characteristic can be reduced, which makes a greater spread between the hard characteristic and the soft characteristic possible.

Within the context of the present disclosure, a control member is understood to mean an element, by way of which a flow passage way can be closed partially or completely, whereby either the volumetric flow of the throughflow is reduced or no volumetric flow takes place, in particular on the flow passage way between the working space which is remote from the piston rod and the compensation space. For example, a control member can be selected from a group comprising a slide, in particular a pointed slide, a flat slide, a round slide, a pin, a ball element, a plate, a contoured piston or a combination thereof.

Within the context of the present disclosure, the position of the control member is understood to mean a position of the control member of a control valve which is arranged in a controllable 4-way bottom valve in the control path in the range from completely open to completely closed. For example, in the completely closed position of the control member, the flow passage way between the working space which is remote from the piston rod and the compensation space is completely closed and no throughflow is possible, and, in the completely open position of the control member, the flow passage way between the working space which is remote from the piston rod and the compensation space is completely open and the maximum throughflow is possible. In particular, in the case of a position of the control member in the range between the completely closed and the completely open position, positions which are partially closed or partially open are also possible, the throughflow being dependent on the opening of the flow passage way.

Within the context of the present disclosure, a fluidic connection is understood to mean a connection and, in particular, a connecting element which makes a fluidic connection possible between regions, in particular containers. For example, a fluidic connection can be configured as a connecting line, a connecting hose or a combination thereof.

In accordance with a further embodiment of the present disclosure, the control member has at least one restoring element which is arranged on the one side of the control member which can be loaded with the pressure of the piston rod-side working space and/or on the other side of the control member which can be loaded with the prevailing pressure of the compensation space, the position of the control member controlling the flow passage way of the first two ways of the 4-way bottom valve at least in a manner which is dependent on that pressure of the piston rod-side working space and/or of the at least one restoring element which is arranged on the one side, which pressure prevails on the control member on the one side, and in a manner which is dependent on that pressure of the compensation space and/or of the at least one restoring element which is arranged on the other side, which pressure prevails on the control member on the other side.

Within the context of the present disclosure, a restoring element is understood to mean an element which can load the control member with a resistance force and which can at least partially output the energy again which is absorbed in the case of an action of force. For example, a restoring element can be selected from a group comprising a spring element, in particular a spiral spring, a cup spring, a flat spring, an elastic element or a combination thereof.

Within the context of the present disclosure, the term "can be loaded with a pressure" is used functionally, in particular for the clear assignment by definition of the respective side, for example in relation to the one and/or other side of the restoring element.

In accordance with a further embodiment of the present disclosure, the position of the control member controls the flow passage way of the first two ways of the 4-way bottom valve in such a way that a pressure prevails in the piston rod-side working space such that no gas release takes place in the case of damping fluid which is arranged in the piston rod-side working space.

Within the context of the present disclosure, a gas release is understood to mean the release of a gas which is contained in a fluid, in particular a gas phase, from the fluid and is also called, for example, "bubbling."

In accordance with a further embodiment of the present disclosure, the position of the control member controls the flow passage way of the first two ways of the 4-way bottom valve in such a way that the pressure in the piston rod-side working space is greater than or equal to the pressure in the compensation space.

In a further embodiment of the present disclosure, the at least one working piston compression stage valve is a valve which can be adjusted for the working piston compression stage, and/or the at least one working piston rebound stage valve is a valve which can be adjusted for the working piston rebound stage.

In accordance with a further embodiment of the present disclosure, the bottom valve additionally has at least one bottom compression stage hard valve and/or at least one bottom rebound stage valve for controlling the flow of the damping liquid between the working space which is remote from the piston rod and the compensation space, and/or additionally has at least one bottom compression stage soft valve, the at least one bottom compression stage hard valve connecting the working space which is remote from the piston rod to the compensation space, and the bottom compression stage soft valve being arranged on the controllable 4-way bottom valve of the bottom valve in such a way that the first two ways of the 4-way bottom valve, as flow passage ways, connect the working space which is remote from the piston rod via the control member and the bottom compression stage soft valve to the compensation space.

Within the context of the present disclosure, a bottom compression stage hard valve is understood to mean a valve, by way of which the hard characteristic of the compression stage is achieved with a bottom valve. Within the context of the present disclosure, a bottom compression stage soft valve is understood to mean a valve, by way of which the soft characteristic of the compression stage is achieved with a bottom valve. The bottom valve generates the same pressure difference as the working piston, a hard characteristic being understood to mean a great pressure difference, and a soft characteristic being understood to mean a smaller pressure difference in comparison with the great pressure difference.

In a further embodiment of the present disclosure, the at least one bottom compression stage hard valve is an adjustable valve for setting the hard characteristic of the compression stage and/or the at least one bottom rebound stage valve is an adjustable valve for setting the characteristic of the rebound stage.

In accordance with a further embodiment of the present disclosure, the vibration damper is at least one twin-tube vibration damper with a second tube with an inner wall, the damper tube being arranged within the second tube, and the compensation space being configured in a region between the outer wall of the damper tube and the inner wall of the second tube.

In accordance with a further embodiment of the method according to the present disclosure for operating a compression stage of a vibration damper, at least one bottom compression stage hard valve which connects the working space which is remote from the piston rod to the compensation space is additionally provided in a further step c), and the controllable 4-way bottom valve additionally a bottom compression stage soft valve in the bottom valve, the bottom compression stage soft valve being arranged in such a way that the first two ways of the 4-way bottom valve, as flow passage ways, connect the working space which is remote from the piston rod via the control member and the bottom compression stage soft valve to the compensation space, the hard characteristic of the bottom valve being set by way of the at least one bottom compression stage hard valve which is provided in step c), and the soft characteristic of the bottom valve taking place by way of the bottom compression stage soft valve.

EXAMPLES

In the following table, the possibilities of the combination of the controllable 4-way bottom valve, the at least one bottom compression stage hard valve, the at least one bottom rebound stage valve and the at least one bottom compression stage soft valve are shown by way of example.

TABLE

Possible combinations of the valves.

| Controllable 4-way bottom valve | Bottom compression stage hard valve | Bottom rebound stage valve | Bottom compression stage soft valve |
|---|---|---|---|
| x | | | |
| x | x | | |
| x | x | x | |
| x | x | x | |
| x | x | x | x |
| x | | x | x |
| x | | x | |

FIG. 1 shows a longitudinal section of a piston/damper tube assembly 1 in the region of a working piston 4 and a bottom valve 9 with a damper tube 2, a piston rod 3 and the working piston 4 which is arranged on the piston rod 3 in accordance with one embodiment of the present disclosure. The working piston 4 divides the interior space of the damper tube 2 into a piston rod-side working space 5 and a working space 6 which is remote from the piston rod.

During a compression stage operation, in the case of which the working piston 4 moves towards the bottom valve 9, a main flow from the working space 6 which is remote from the piston rod can flow through the working piston 4 via a working piston compression stage valve 7, in order to pass into the piston rod-side working space 5.

During a rebound stage operation, in the case of which the working piston 4 moves away from the bottom valve 9, a fluid main flow from the piston rod-side working space 5 can flow through the working piston 4 via a working piston rebound stage valve 8, in order to pass into the working space 6 which is remote from the piston rod. The working piston compression stage valve 7 and the working piston rebound stage valve 8 are configured as valves which can be adjusted, in particular can be set. The working space 6 which is remote from the piston rod is connected to a compensation space 10 via the bottom valve 9. A controllable 4-way bottom valve 12 and a bottom compression stage soft valve 15 are arranged in the bottom valve 9.

During a compression stage operation, a main flow from the working space 6 which is remote from the piston rod can flow through the bottom valve 9 via the bottom compression stage hard valve 14 and/or the first two ways of the 4-way bottom valve 12 of the controllable 4-way bottom valve 12, in order to pass into the compensation space 10.

During a rebound stage operation, a fluid main flow from the compensation space 10 can flow through the bottom valve 9 via the bottom rebound stage valve 11 and the first two ways of the four-way bottom valve, if no bottom compression stage soft valve is installed, in order to pass into the working space 6 which is remote from the piston rod.

The controllable 4-way bottom valve 12 has a control member 13 and a restoring element 16. The first two ways of the 4-way bottom valve 12 connect, as flow passage ways, the working space 6 which is remote from the piston rod via the control member 13 and the bottom compression stage soft valve 15 to the compensation space 10.

The second two ways of the 4-way bottom valve 12 are configured as control paths, the control member 13 of the 4-way bottom valve 12 being connected fluidically via a fluidic connection 17 on the one side to the piston rod-side working space 5 and therefore being loaded with the pressure of the piston rod-side working space 5, and being loaded on the other side with the pressure of the compensation space 10 via an opening 18, the position of the control member 13 limiting the flow passage way of the first two ways of the 4-way bottom valve 12 at least in a manner which is dependent on that pressure of the piston rod-side working space 5 and/or of the at least one restoring element 16 which is arranged on the one side, which pressure prevails on the control member 13 on the one side and/or on that pressure of the compensation space 10 and/or of the at least one restoring element 16 which is arranged on the other side, which pressure prevails on the control member 13 on the other side.

Figure 2:
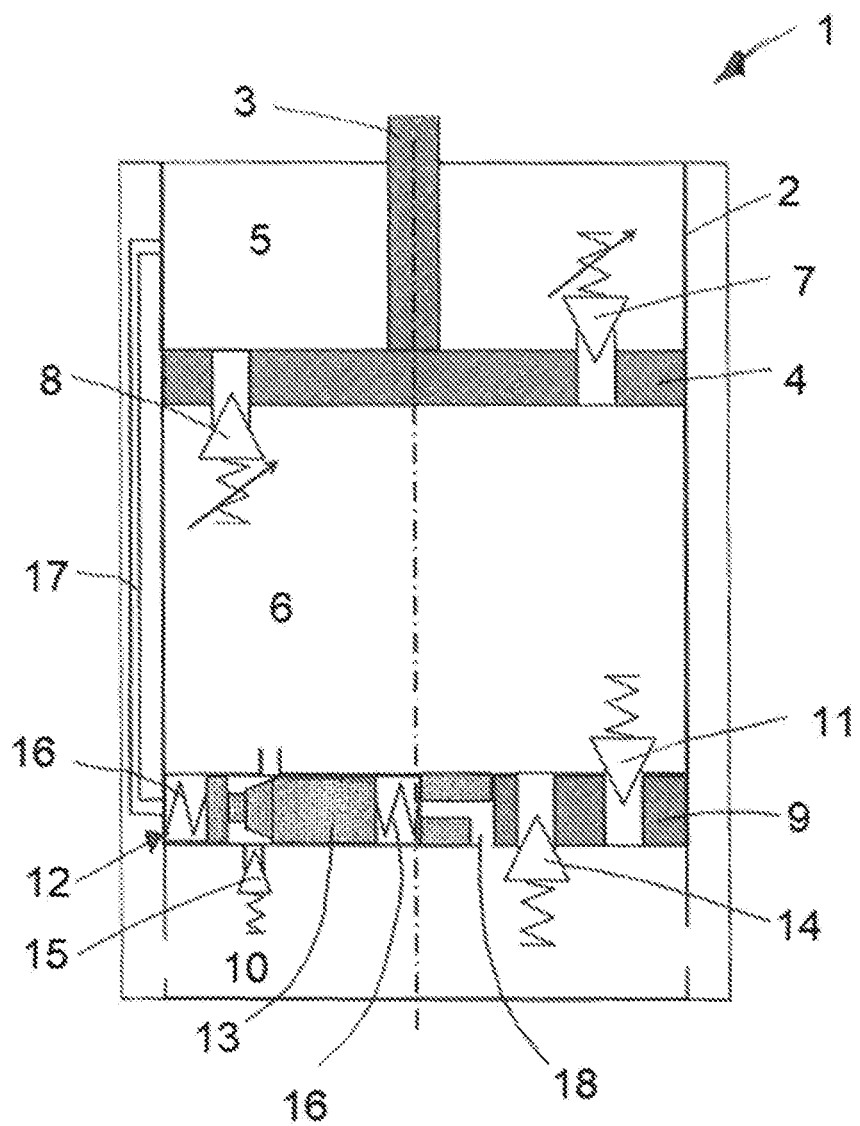
FIG. 2 is a diagrammatic view of an example working piston in accordance with FIG. 1 with an additional bottom compression stage hard valve and a bottom rebound stage valve.

FIG. 2 shows one embodiment of the present disclosure in accordance with FIG. 1 with an additional bottom compression stage hard valve 14 and a bottom rebound stage valve 11.

The bottom rebound stage valve 11 and the bottom compression stage hard valve 14 are arranged in the bottom valve 9. The parallel connection of the first two ways of the 4-way bottom valve 12 which, as flow passage ways, connects the working space 6 which is remote from the piston rod via the control member 13 and the bottom compression stage soft valve 15 to the compensation space 10 with respect to the at least one bottom compression stage hard valve 14 which connects the working space 6 which is remote from the piston rod to the compensation space 10 can be seen from the bottom valve 9 which is shown.

Piston/damper tube assemblies and vibration dampers of the above-described type may be used in the production of, for example and without limitation, vehicles, in particular of chassis of motor vehicles.

LIST OF REFERENCE NUMERALS

1=Piston/damper tube assembly
2=Damper tube
3=Piston rod
4=Working piston
5=Piston rod-side working space
6=Working space which is remote from the piston rod
7=Working piston compression stage valve
8=Working piston rebound stage valve
9=Bottom valve
10=Compensation space
11=Bottom rebound stage valve
12=4-way bottom valve
13=Control member
14=Bottom compression stage hard valve
15=Bottom compression stage soft valve
16=Restoring element
17=Fluidic connection
18=Opening

What is claimed is:

1. A piston/damper tube assembly comprising:
   a piston rod;
   a damper tube that is filled at least partially with damping fluid, wherein the piston rod is movable to and fro in the damper tube, wherein the damper tube has an outer wall;
   a working piston that is movable with the piston rod, wherein by way of the working piston an interior space of the damper tube is divided into a piston rod-side working space and a working space that is remote from the piston rod, wherein the working piston has a working piston compression stage valve and a working piston rebound stage valve for flow regulation of the damping fluid between the piston rod-side working space and the working space;
   a bottom valve that closes the working space; and
   a compensation space disposed on the bottom valve on a side of the bottom valve that faces away from the working space, with the compensation space being filled partially with damping fluid
   wherein the bottom valve includes a controllable 4-way bottom valve with a control member, wherein two flow passageways of the controllable 4-way bottom valve connect the working space via the control member to the compensation space, wherein two control passages of the controllable 4-way bottom valve load the control member on a first side with a pressure of the piston rod-side working space and a second side with a pressure of the compensation space, wherein a position of the control member controls the two flow passageways of the controllable 4-way bottom valve at least in a manner that is dependent on the pressure of the piston rod-side working space that prevails on the control member on the first side via a fluidic connection, and on the pressure of the compensation space that prevails on the control member on the second side via an opening.

2. The piston/damper tube assembly of claim 1 wherein the control member includes a restoring element that is disposed on at least one of the first side or the second side of the control member, the position of the control member controlling the two flow passageways of the controllable 4-way bottom valve at least in a manner that is dependent on the pressure of the piston rod-side working space and/or of the restoring element disposed on the first side, and in a manner that is dependent on the pressure of the compensation space and/or the restoring element disposed on the second side.

3. The piston/damper tube assembly of claim 1 wherein the position of the control member controls the two flow passageways of the controllable 4-way bottom valve such that a pressure prevails in the piston rod-side working space such that no gas release occurs in a case of damping fluid arranged in the piston rod-side working space.

4. The piston/damper tube assembly of claim 1 wherein at least one of
   the working piston compression stage valve is adjustable for a working piston compression stage, or
   the working piston rebound stage valve is adjustable for a working piston rebound stage.

5. The piston/damper tube assembly of claim 1 wherein the bottom valve includes at least one of a bottom compression stage hard valve or a bottom rebound stage valve for controlling flow of damping fluid between the working space and the compensation space.

6. The piston/damper tube assembly of claim 5 wherein the bottom valve includes a bottom compression stage soft valve, wherein the bottom compression stage hard valve connects the working space to the compensation space, wherein the bottom compression stage soft valve is disposed on the controllable 4-way bottom valve such that the two flow passageways of the controllable 4-way bottom valve connect the working space via the control member and the bottom compression stage soft valve to the compensation space.

7. A vibration damper comprising a piston-damper tube assembly, wherein the piston/damper tube assembly comprises:
- a piston rod;
- a damper tube that is filled at least partially with damping fluid, wherein the piston rod is movable to and fro in the damper tube, wherein the damper tube has an outer wall;
- a working piston that is movable with the piston rod, wherein by way of the working piston an interior space of the damper tube is divided into a piston rod-side working space and a working space that is remote from the piston rod, wherein the working piston has a working piston compression stage valve and a working piston rebound stage valve for flow regulation of the damping fluid between the piston rod-side working space and the working space;
- a bottom valve that closes the working space; and
- a compensation space disposed on the bottom valve on a side of the bottom valve that faces away from the working space, with the compensation space being filled partially with damping fluid,
- wherein the bottom valve includes a controllable 4-way bottom valve with a control member, wherein two flow passageways of the controllable 4-way bottom valve connect the working space via the control member to the compensation space, wherein two control passages of the controllable 4-way bottom valve load the control member on a first side with a pressure of the piston rod-side working space and a second side with a pressure of the compensation space, wherein a position of the control member controls the two flow passageways of the controllable 4-way bottom valve at least in a manner that is dependent on the pressure of the piston rod-side working space that prevails on the control member on the first side via a fluidic connection, and on the pressure of the compensation space that prevails on the control member on the second side via an opening.

8. The vibration damper of claim 7 configured as a twin-tube vibration damper with a second tube with an inner wall, with the damper tube being disposed within the second tube, wherein the compensation space is configured in a region between the outer wall of the damper tube and the inner wall of the second tube.

9. A method for operating a compression stage of the vibration damper of claim 7, the method comprising:
providing the vibration damper of claim 7; and
at least partially compressing the vibration damper by generating compression stage damping forces, wherein throughflow control through the two flow passageways of the 4-way controllable bottom valve takes place at least
- in a manner that is dependent on the pressure of the piston rod-side working space and/or a restoring element disposed on the first side, which pressure prevails on the control member on the first side via the fluidic connection,
- in a manner that is dependent on the pressure of the compensation space and/or the restoring element that is disposed on the second side, which pressure prevails on the control member on the second side via the opening, and
- in a manner that is dependent on a resultant position of the control member.

10. The method of claim 9 comprising:
providing a bottom compression stage hard valve that connects the working space to the compensation space; and
providing a bottom compression stage soft valve in the bottom valve, the bottom valve compression stage soft valve being disposed such that the two flow passageways of the controllable 4-way bottom valve connect the working space via the control member and the bottom compression stage soft valve to the compensation space;
wherein a hard characteristic of the bottom valve is set by way of the bottom compression stage hard valve, wherein a soft characteristic of the bottom valve takes place by way of the bottom compression stage soft valve.

* * * * *